United States Patent
Lane et al.

(10) Patent No.: US 6,877,617 B2
(45) Date of Patent: Apr. 12, 2005

(54) PRODUCT DISPLAY SYSTEM (76) Inventors: Frank E. Lane, 3209 NE. 68th Ter., Kansas City, MO (US) 64119; Donald E. Vogel, 32208 E. 179th St., Pleasant Hill, MO (US) 64080; John W. Lewman, 7608 Haskins St., Lenexa, KS (US) 66216

(*) Notice: Subject to any disclaimer, the term of this patent is extended or adjusted under 35 U.S.C. 154(b) by 0 days.

(21) Appl. No.: 10/446,447

(22) Filed: May 28, 2003

(65) Prior Publication Data

US 2003/0193001 A1 Oct. 16, 2003

Related U.S. Application Data (63) Continuation of application No. 09/946,647, filed on Sep. 4, 2001, now Pat. No. 6,604,637.

(51) Int. Cl.⁷ ................................................. A47F 5/00
(52) U.S. Cl. .................... 211/59.1; 211/57.1; 248/225.1
(58) Field of Search ............................... 211/59.1, 57.1, 211/106; 248/220.21, 220.22, 220.31, 221.11, 220.41, 222.12, 223.41, 225.11; 40/642.01

(56) References Cited

U.S. PATENT DOCUMENTS

| | | | | |
|---|---|---|---|---|
| 3,645,485 A | * | 2/1972 | Gold ...................... 248/220.41 |
| 4,146,204 A | * | 3/1979 | Thalenfeld ............. 248/220.41 |
| 4,286,764 A | * | 9/1981 | Pfeifer ................... 248/220.22 |
| 4,351,440 A | * | 9/1982 | Thalenfeld ................. 211/57.1 |
| 4,474,351 A | * | 10/1984 | Thalenfeld ............. 248/220.22 |
| 4,724,967 A | * | 2/1988 | Valiulis ..................... 211/59.1 |
| 4,805,861 A | * | 2/1989 | Thalenfeld et al. .... 248/221.11 |
| 4,832,298 A | * | 5/1989 | Metcalf .................. 248/225.21 |
| 5,031,783 A | * | 7/1991 | Goudreau ................. 211/181.1 |
| 5,080,238 A | * | 1/1992 | Hochman ................... 211/59.1 |
| 5,503,277 A | * | 4/1996 | O'Brien ................. 211/106.01 |
| 5,582,376 A | * | 12/1996 | Thompson ................... 248/214 |
| 5,860,239 A | * | 1/1999 | Thalenfeld et al. ....... 40/642.01 |
| 6,059,124 A | * | 5/2000 | Weck et al. ............... 211/57.1 |
| 6,119,874 A | * | 9/2000 | Anderson ................... 211/57.1 |
| 6,189,847 B1 | * | 2/2001 | Hart ...................... 248/220.31 |
| 6,193,079 B1 | * | 2/2001 | Wiemer ..................... 211/59.1 |
| 6,389,722 B1 | * | 5/2002 | Josefsson et al. ........ 40/642.01 |
| 2001/0047974 A1 | * | 12/2001 | Berlingeri | |

FOREIGN PATENT DOCUMENTS

WO    WO 00/08512    *    5/2000

OTHER PUBLICATIONS

Letter from Ken West to Rod Watson; 2 pages; Mar. 17, 2000.*

Fax from Gene Dearling to Rod Watson; 3 pages; Mar. 16, 2000.*

* cited by examiner

Primary Examiner—Ramon O Ramirez
(74) Attorney, Agent, or Firm—Fish & Richardson P.C., P.A.

(57) ABSTRACT

An improved display system may include an integral hook and bracket system which can be mounted to both wire grid and hanger bar fixture systems. An adapter unit may also be provided, wherein the adaptor configures the system to be mounted to pegboard and slot wall fixture systems. In such embodiments, the system is universally compatible with a wide variety of different fixture systems. The system may also include a product information display member opposite the adaptor member.

22 Claims, 7 Drawing Sheets

PRODUCT DISPLAY SYSTEM

CROSS-REFERENCE TO RELATED APPLICATIONS

This application is a continuation of U.S. application Ser. No. 09/946,647, filed on Sep. 4, 2001 now U.S. Pat. No. 6,604,637 by Frank E. Lane et al.; entitled "Product Display System", which is incorporated herein by reference in its entirety.

TECHNICAL FIELD

The present invention relates generally to the display of products, especially retail products. More specifically, the invention relates to brackets and hook systems for the display of products on a variety of different fixtures.

BACKGROUND

The packaging for many retail products is specifically designed to permit the products to be hung from a display hook. This display arrangement provides several benefits, including providing customers with an unobstructed view of the product, decreasing the amount of space necessary to display each product, and facilitating restocking operations.

Several different wall fixtures have been developed to meet the strong demand for hook display systems. The most prevalent are pegboards, hanger bars, wire grids and slat walls. Pegboard fixtures are similar to the perforated hardboard often used in residential applications for the hanging of yard tools and the like. U.S. Pat. No. 4,560,062, "Method and Apparatus for Supporting a Display Carton," issued to Valiulis on Dec. 24, 1985, illustrates how pegboard may be used for the display of retail products.

Hanger bars are horizontally disposed thin slats of metal, often about 0.20–0.25 inch thick and about 1.00–1.25 inch tall, onto which a specially designed hook or similar device can be placed. As described and shown in U.S. Pat. No. 4,286,764, issued on Sep. 1, 1981 to Pfeifer, several hooks can be mounted to a hanger bar and then selectively moved in a lateral direction to permit the efficient display of merchandise having a variety of different configurations and sizes.

An exemplary wire grid product display system is shown in U.S. Pat. No. 4,832,298, issued May 23, 1989 to Metcalf. Rows of evenly spaced heavy gauge wire extend horizontally and, at a significantly greater spacing, vertical support wires are welded to the rear of the horizontal wire array. The wire is often 7 gauge, or about 0.1875 in diameter. Hooks are mounted directly to the horizontal wires, but their horizontal movement is limited by the interfering vertical support wires.

Slat walls, sometimes also called slot walls, have horizontal slots to receive a mounting bracket. As explained and illustrated in U.S. Pat. No. 5,582,376, issued Dec. 10, 1996 to Thompson, in cross section the slots have a tapered "T" shape. One end of a bracket having a "Z" shape is introduced into the stem and one of the branches of the "T," and thereafter allowed to rotate into a fixed position.

The brackets and hooks used with each of the foregoing systems are generally incompatible with other fixture systems. For example, wire grid brackets typically cannot be used on hanger bars, wire grids, or slat walls. Accordingly, it is often necessary for merchants to stock and install different brackets and hooks for each type of display fixture. Manufacturers likewise suffer from lost economies of scale because lack of standardization necessitates the production and distribution of lesser quantities of a wider variety of hooks and brackets.

SUMMARY

In one aspect, the present invention is directed to an improved display system that is compatible with a variety of different fixtures. In an illustrative embodiment, an integral hook and bracket system can be mounted to both wire grid and hanger bar fixture systems. After attachment of an adapter unit, the system of the illustrative embodiment can also be mounted to pegboard and slot wall fixture systems.

In another aspect, the invention relates to an improved display device that incorporates a product information display member. In another illustrative embodiment, an integral hook and bracket assembly compatible with a plurality of different fixture systems includes a horizontally extending product information placard.

The details of one or more embodiments of the invention are set forth in the description below. Other features, objects, and advantages of the invention will be apparent from the description, and from the claims.

BRIEF DESCRIPTION OF THE DRAWINGS

Like reference numbers and designations in the various drawings indicate like elements.

DETAILED DESCRIPTION OF ILLUSTRATIVE EMBODIMENTS

Figure 1:
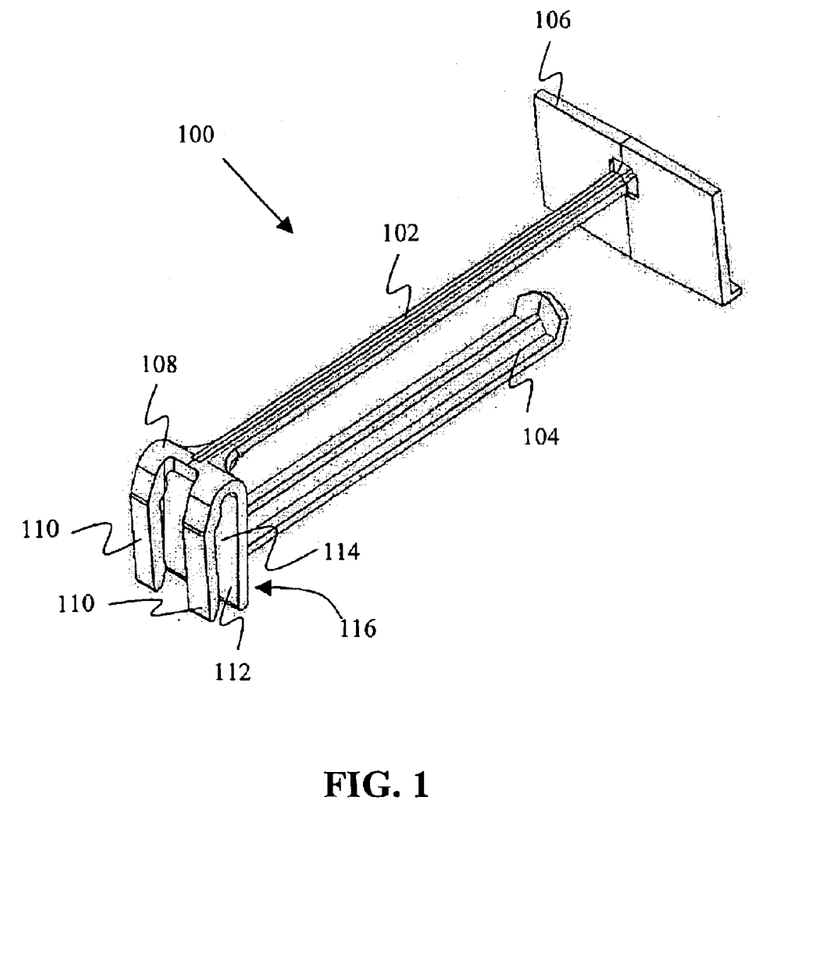
FIG. 1 is a perspective view of a product display hook that is compatible with wire grid fixtures and hanger bar fixtures.

FIG. 1 depicts a display hook 100 constructed in accordance with the present invention. Display hook 100 includes a support element 108 in the form of a mounting bracket, hanger hook 104, product label arm 102 and product label placard 106. The support element 108 includes a rear face 112 and an internal channel 114. Extending rearwardly from the rear face 112 are two laterally spaced mounting members in the form of extending fingers 110, the distal ends of which are parallel to the rear face 112. The hook 104 extends horizontally from the front face 116 of the support element 108 and terminates in a upwardly raised lip portion 118. The product label arm 102 similarly extends from the front face 116 of the support element 108. The arm 102 terminates in a product information placard 106 disposed in a generally vertically plane that is substantially parallel to the front face 116 of the support element 108. Preferably, the entire display hook is integrally formed of relatively impact resistant poly-alpha-olefin via injection molding. Most preferably, one to six inch hooks are constructed of 38% glass-filled polycarbonate and seven to ten inch hooks are constructed with 43% glass-filled nylon. Alternatively, the hook may be made from metal, composites, or other suitable materials known in the art.

Figure 2:
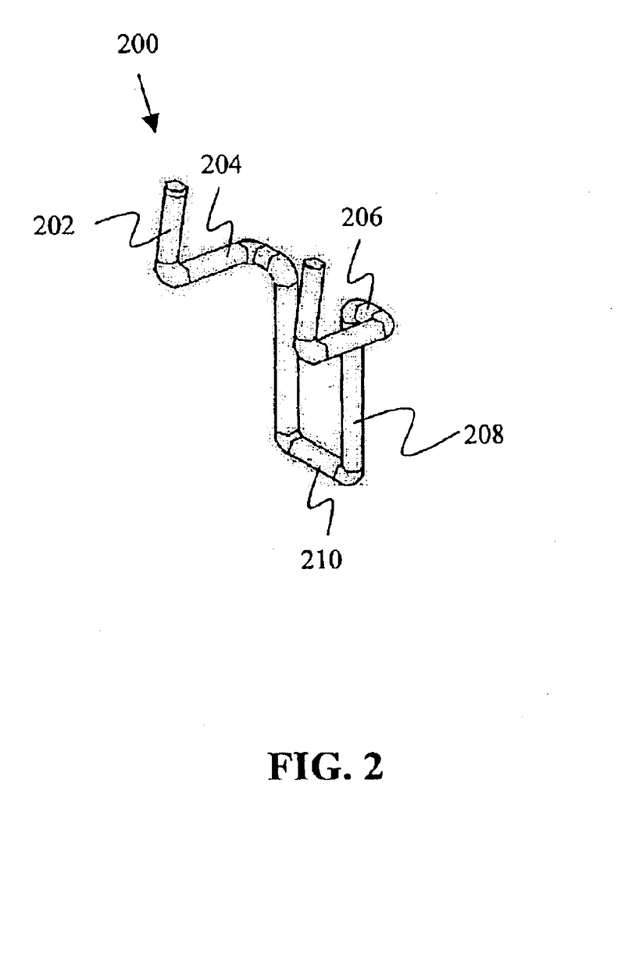
FIG. 2 is a perspective view an adapter for use with the product display hook of FIG. 1.

FIG. 2 depicts an adapter unit 200 for use in connection with the display hook 100. The adapter 200 can be formed out of a single piece of heavy gauge metal wire or high yield strength injection molded plastic, but can be advantageously constructed from any suitably durable material. The adapter 200 depicted in FIG. 2 is formed of heavy gauge wire. The distal hook portions 202 segue into horizontal extension portions 204 and 206. Vertical clip-in sections 208 and horizontal clip-in sections 210 are adapted to be held inside interior channel 114 of the display hook 110, as is described in more detail hereinbelow.

Figure 3:
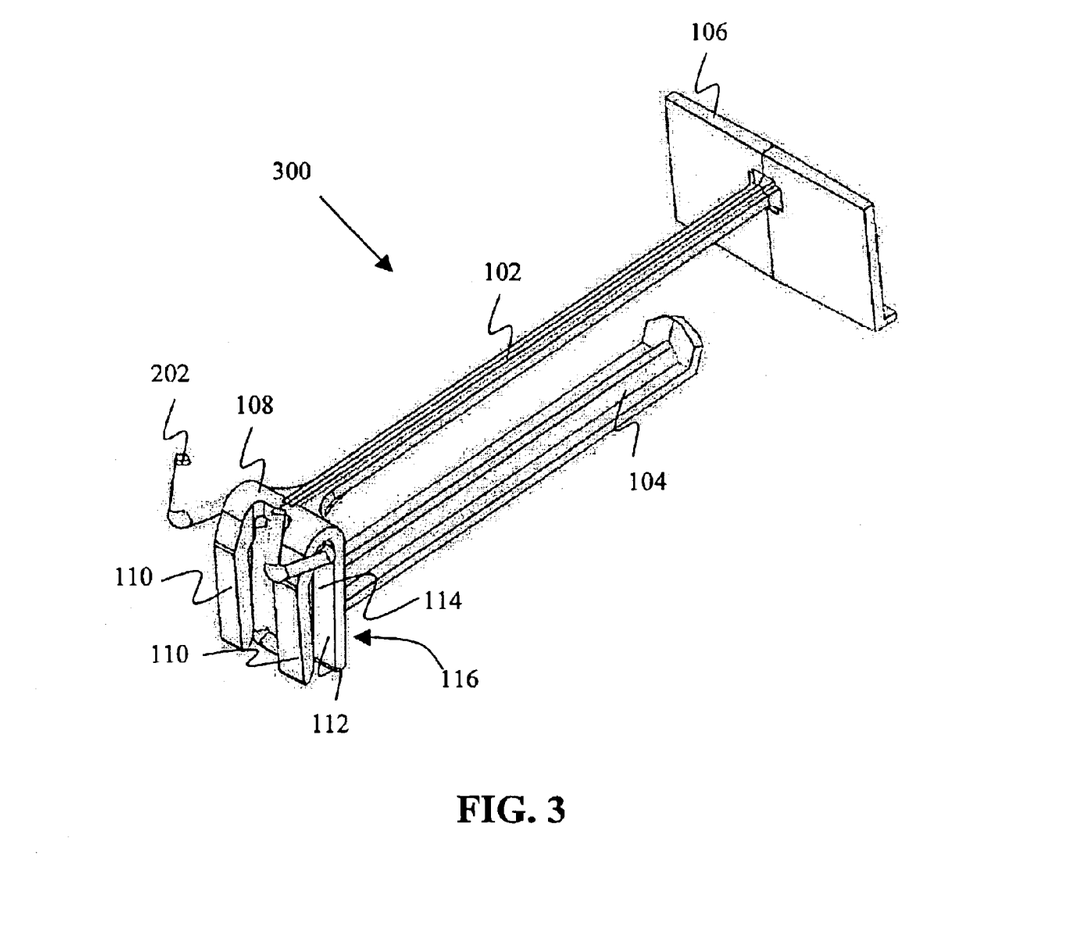
FIG. 3 is a perspective view of the product display hook of FIG. 1 with the adapter of FIG. 2 installed therein.

FIG. 3 illustrates the manner in which adapter 200 cooperates with display hook 100. Distal portions of fingers 110 are placed in contact with the upper surface of horizontal sections 206. By application of downward force, the distal ends of fingers 110 pass over sections 208, along vertical wire sections 208, and then into engagement with horizontal clip-in section 210. Elastic bending force created by movement the fingers away from rear face 112 holds adapter 200 in place within the interior channel 114 of display hook 100.

Figure 4:
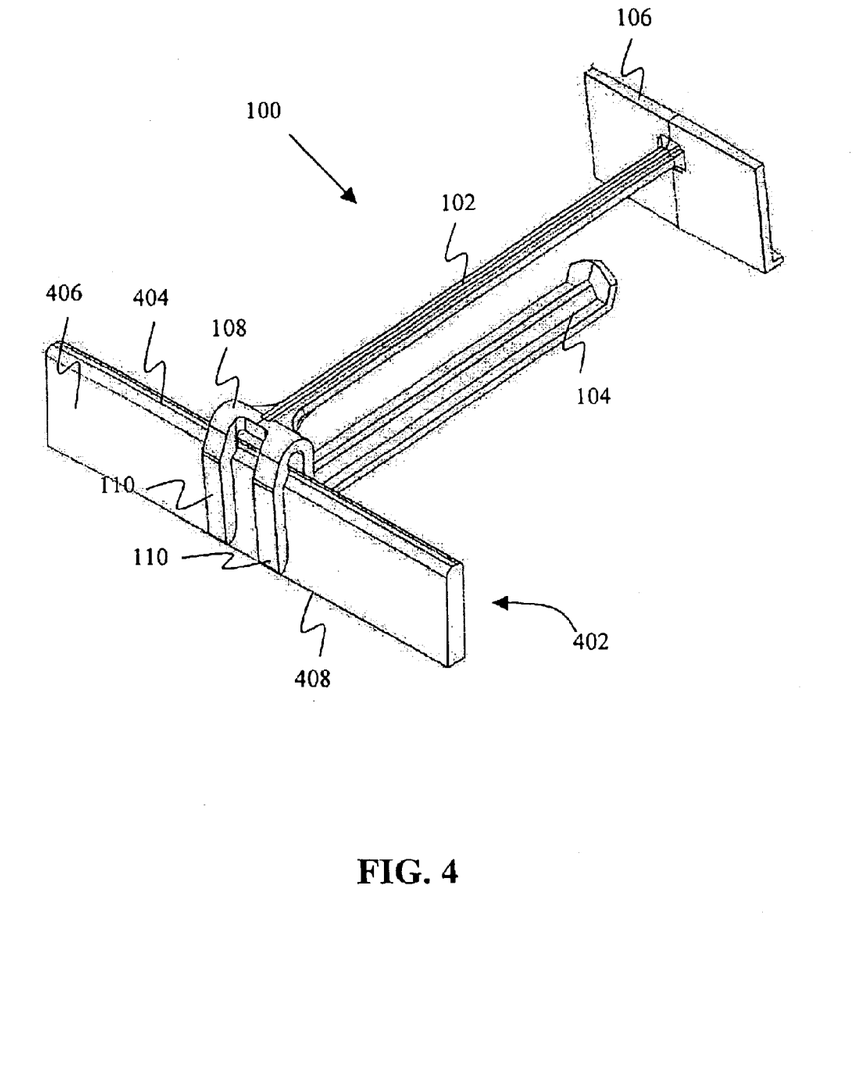
FIG. 4 is a perspective view of the product display hook of FIG. 1 mounted on a hanger bar.

Returning to FIG. 1, the depicted display hook is fully compatible with both wire grids and hanger bars. FIG. 4 illustrates the installation of display hook 100 on hanger bar 402. Display hook 100 is mounted on hanger bar 402 in a fashion similar to that described above in connection with the adapter unit 200. Distal portions of fingers 110 are placed in contact with the upper surface 404 of hanger bar 402. By application of downward force, the distal ends of fingers 110 pass downward over the face 406 of hanger bar 402. Elastic bending force created by movement the fingers away from rear face 112 holds display hook 100 firmly in place on hanger bar 402. Optionally, the fingers 110 may be configured so as to project slightly below lower edge 408 of hanger bar 402, so that a ridge or similar projection on the internal surface of fingers 110 contacts the lower edge 408 of hanger bar 402. In such embodiments, the ridge serves to more securely hold display hook 100 on hanger bar 402.

Figure 5:
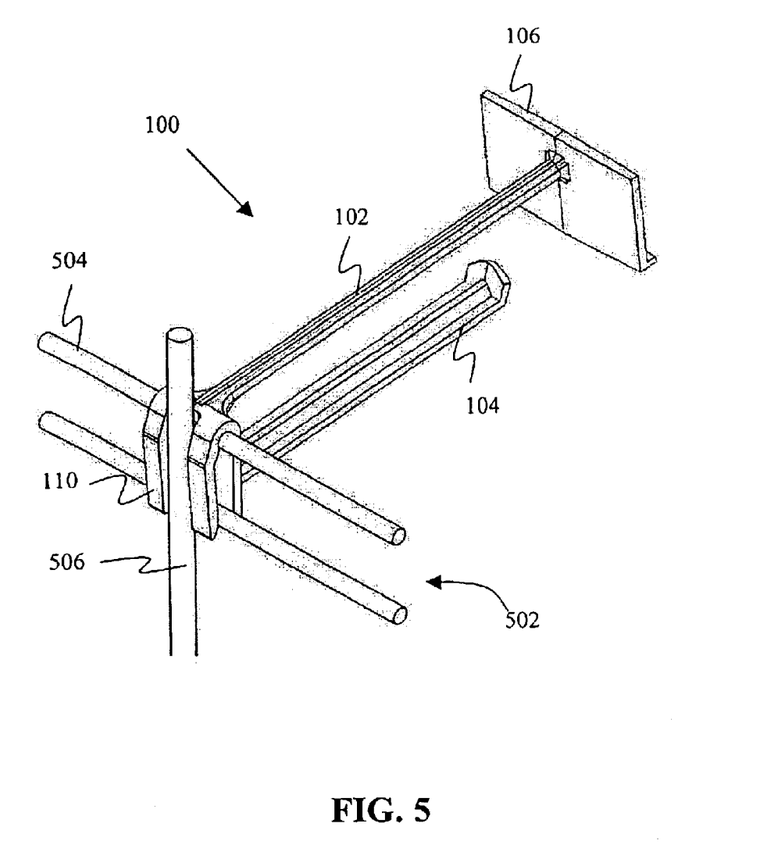
FIG. 5 is a perspective view of the product display hook of FIG. 1 mounted on a wire grid and aligned with a vertical wire on the wire grid.

Turning now to FIG. 5, the display hook 100 is mounted on a wire grid 502. The fingers 110 extend around the rear surface of the horizontal wires 504. Here again, a ridge, detent or similar aberration on the internal surface of fingers 110 can be incorporated to more securely affix display hook 100 to horizontal wires 504. Advantageously, the split or gap between fingers 110 permits the display hook to be mounted in alignment with a vertical wire 506, as shown.

Figure 6:
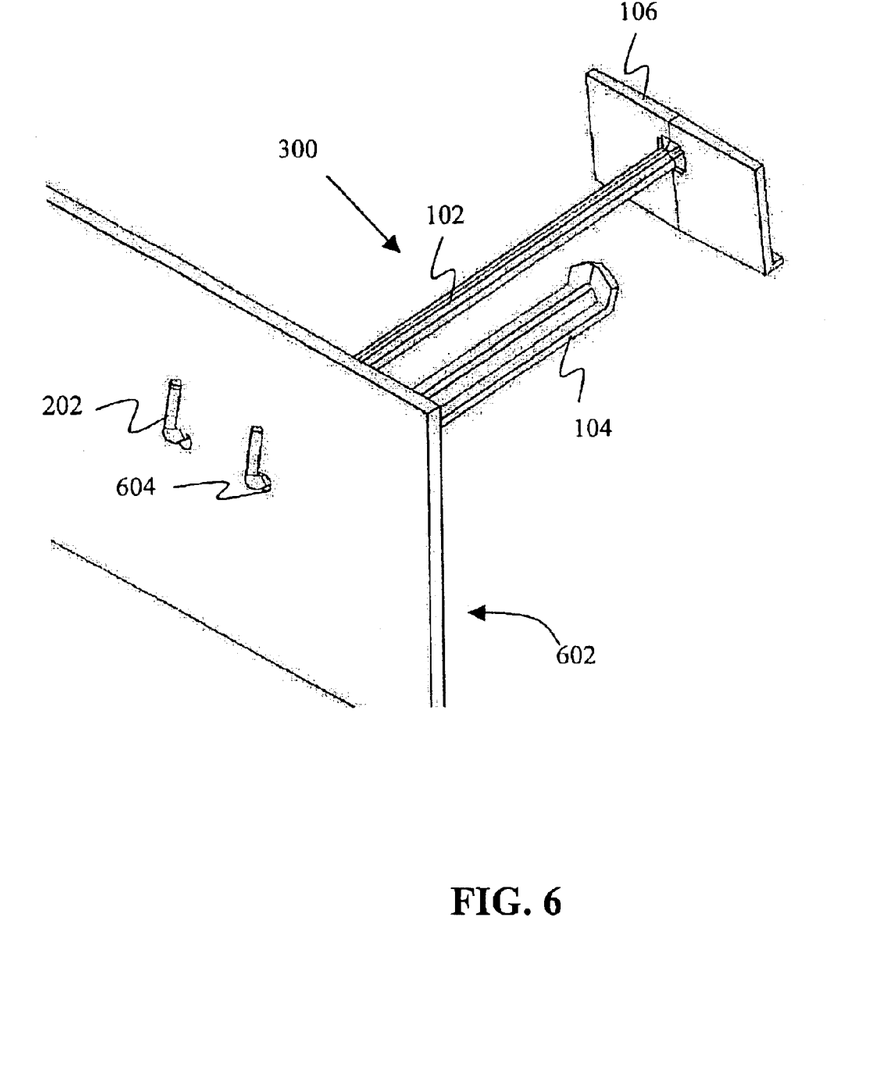
FIG. 6 is a perspective view of the product display hook of FIG. 3 mounted on a peg board.

FIG. 6 depicts the hook and adapter combination 300 (shown in FIG. 3) installed on a peg board 602. Distal hook portions 202 of adapter 200 reside behind peg board 602. To release the hook and adapter unit 300 from peg board 602, the display hook is raised vertically, which has the effect of pulling horizontal wire sections 204 slightly out of the peg holes 604 and tilting hook sections 202 toward a horizontal plane. By continuing the lifting motion while pulling the unit 300 away from the peg board 602, the unit 300 is fully released therefrom. Installation is accomplished by reversing the foregoing steps.

Figure 7:
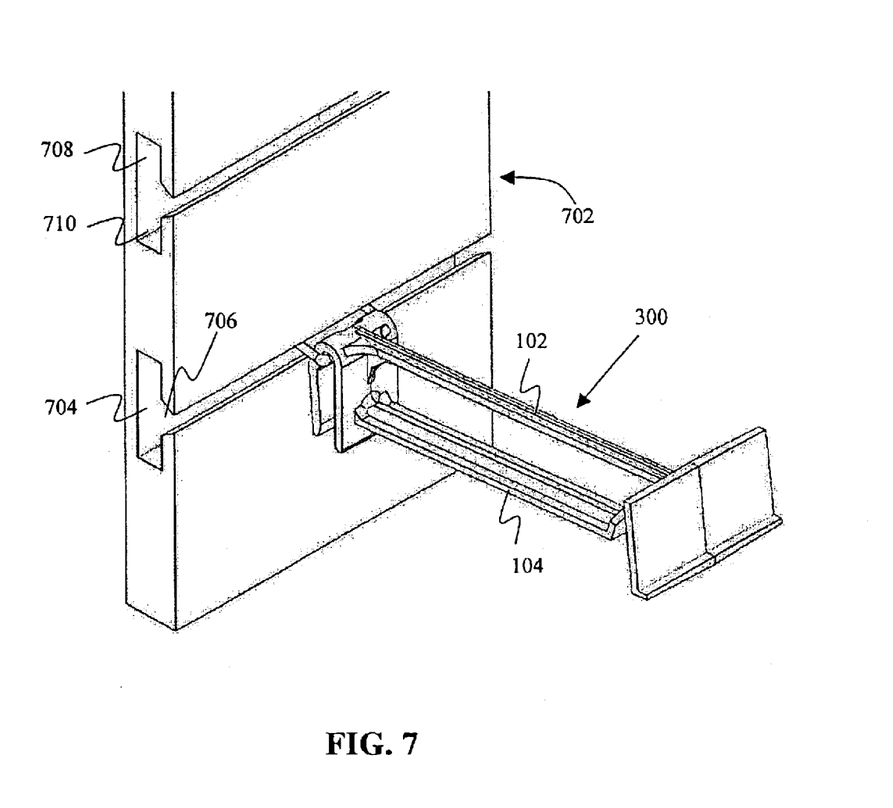
FIG. 7 is a perspective view of the product display hook of FIG. 3 mounted on a slat wall.

FIG. 7 illustrates the hook and adapter unit 300 installed on a slat wall 702. Slat wall 702 has T-shaped channel 704 with a stem 706 and vertically extending channels 708, 710. In the same manner described above in connection with the peg board application, the unit 300 is installed with its hook portions 202 projecting upwardly into the vertical channel 708. The gravity and friction firmly maintain the hook and adapter unit 300 in place.

The configuration of the display hook and adapter of the instant invention can be readily modified to accommodate different fixture configurations and provide additional functionalities. For instance, extending hooks may be incorporated directly into support element 108 so as to obviate the need for a separate adapter. The display hook and adapter can advantageously be integrally formed of metal in such embodiments. The faces 112 and 116 of the mounting section 108 need not be planar or flat. Similarly, the fingers 110 need not have a flat, planar construction. The gap between fingers 110 can be advantageously bridged to provide further structural support for particular applications. The length of fingers 110 can be readily modified to, for example, ensure that a ridge, detent, or other mating structure on finger 110 cooperates with a hanger bar, wire grid, or other display fixture. The adapter 200 can also have a variety of different configurations. Wire sections 206, 208, and 210 can be advantageously replaced with a single planar body section that occupies substantially all the interior channel 114 of bracket section 108. The hook sections 202 can be likewise reconfigured to constitute a continuous arcuate flange that is particularly well suited for slat wall applications. As noted above, adapter features (such as the hooks 202) can be incorporated directly into the display hook support element 108, if desired.

The display placard arm 102 and hook 104 can be provided with any number of advantageous configurations. The arm or the hook can be eliminated entirely to provide a label arm without a hook or a hook without a label arm. The latter arrangement is preferred where prices or other applicable information are displayed on the products themselves or on another "price off" device, such as a channel on the front edge of an associated shelving unit. The length of the arm 102 and hook 104 can have any desired length. The arms need not reside in a horizontal plane, and can be advantageously provided in upwardly, sidewardly, or downwardly projecting embodiments. The arms also need not be formed integral with the remainder of the display hook 100. If additional strength or versatility is desired, the various components of display hook assemblies 100, 300, can be made in interfitting relation out of different materials. The placard 106 can be substituted with virtually any known tagging or labeling means. Arm 102 need only be reconfigured to receive and secure the desired tagging or labeling means. Hook 104 is shown as a generally linear bar, but an undulating, stepped, or other desirable configuration can be readily used within the spirit of the instant invention.

The aforementioned aspects of this invention may be also be modified to accommodate display fixtures other than wire grids, hanger bars, slat walls, and peg boards. The mounting components such as hooks 202 and fingers 110 can be advantageously reconfigured so as to be compatible with other existing fixtures, if desired.

The foregoing illustrative embodiments have been described in the context of product display hook. However, those skilled in the art will readily appreciate that the display hook of the instant invention is not limited to use in a retail environment or in connection solely with vertically hung merchandise. Rather, in several of the aforementioned respects the device may be implemented in connection with the display or storage of almost any item in any environment. For instance, the hook and adapter assemblies of the invention may be implemented in warehousing or similar applications where mounting versatility is desired.

A number of embodiments of the present invention have been described. Nevertheless, it will be understood that various additional modifications may be made without departing from the spirit and scope of the invention. Accordingly, other embodiments are within the scope of the following claims.

What is claimed is:

1. A universal display hook system, comprising:
   a hook unit having a proximal end and a distal end, the hook unit including at its distal end an elongate arm for receiving merchandise and further including at its proximal end at least one mounting arm adapted to connect to a first type of display fixture selected from the group consisting of slat wall, wire grid, hanger bar, and peg board fixtures; and
   an adapter configured to be releasably secured by said at least one mounting arm, said adapter configured to connect to a second type of display fixture selected from the group consisting of slat wall, wire grid, hanger bar, and peg board fixtures;
   whereby the hook unit is operable to connect to the first type of display fixture without said adapter and to the second type of a display fixture when the adapter is received on said at least one mounting arm.

2. The display hook system of claim 1, wherein the first type of display fixture is a hanger bar fixture or a wire grid fixture.

3. The display hook system of claim 2, wherein the second type of display fixture is a peg board fixture or a slat wall fixture.

4. The display hook system of claim 1, wherein the at least one mounting arm is operable to connect to a plurality of display fixtures.

5. The display fixture of claim 4, wherein the adapter is operable to connect to a plurality of display fixtures.

6. The display hook system of claim 1, wherein the elongate arm and the at least one mounting arm are integrally formed of the same material.

7. The display hook system of claim 1, wherein the adapter is operable to be received and released by the at least one mounting arm manually and without the use of a tool.

8. The display hook system of claim 1, further comprising a product information display member.

9. The display hook system of claim 1, wherein the hook unit is integrally constructed of plastic and the adapter is constructed of metal.

10. The display hook system of claim 1, wherein the at least one mounting arm comprises a plurality of arms defining a tapered channel adapted to receive a hanger bar or wire grid and the adapter comprises a plurality of arms for being received in a slat wall or peg board fixture.

11. A method for deploying a display system, comprising:
   providing a hook unit having a proximal end and a distal end, the hook unit including at its distal end an elongate arm for receiving merchandise and further including at its proximal end at least one mounting arm adapted to connect to a first type of display fixture;
   providing an adapter configured to be releasably secured by said at least one mounting arm, said adapter configured to connect to a second type of display fixture;
   providing an erected display fixture of said first type or said second type;
   manually attaching said adapter to said hook unit where the fixture is of said second type; and
   connecting said hook unit to said erected display fixture.

12. The method of claim 11, wherein the at least one mounting arm is adapted to connect to at least one display fixture selected from the group consisting of slat wall, wire grid, hanger bar, and peg board fixtures.

13. The method of claim 12, wherein the adapter is configured to connect to at least one display fixture selected from the group consisting of slat wall, wire grid, hanger bar, and peg board fixtures.

14. The method of claim 12, wherein the at least one mounting arm is adapted to connect to a wire grid or a hanger bar fixture.

15. The method of claim 14, wherein the adapter is configured to connect to peg board fixture and a slat wall fixture.

16. The method of claim 11, wherein a tool is used to attach said adapter to said hook unit.

17. The method of claim 11, wherein the at least one mounting arm is operable to connect to a plurality of display fixtures.

18. The method of claim 17, wherein the adapter is operable to connect to a plurality of display fixtures.

19. The method of claim 11, wherein the elongate arm and the at least one mounting arm are integrally formed of the same material.

20. The method of claim 11, wherein the hook unit further comprises a product information display member.

21. The method of claim 11, wherein the hook unit is integrally constructed of plastic and the adapter element-is constructed of metal.

22. The method of claim 21, wherein the at least one mounting arm comprises a plurality of arms defining a tapered channel adapted to receive a hanger bar or wire grid and the adapter comprises a plurality of arms for being received in a slat wall or peg board fixture.

* * * * *

UNITED STATES PATENT AND TRADEMARK OFFICE
CERTIFICATE OF CORRECTION

PATENT NO. : 6,877,617 B2
DATED : April 12, 2005
INVENTOR(S) : Frank E. Lane, Donald E. Vogel and John W. Lewman It is certified that error appears in the above-identified patent and that said Letters Patent is hereby corrected as shown below:

Title page,
Item [56], References Cited, FOREIGN PATENT DOCUMENTS, delete
"WO 00/08512" and insert -- WO 00/28512 --.
OTHER PUBLICATIONS,
"Letter from Ken West to Rod Watson;" reference, delete "Ken" and insert -- Kent --;
"Fax from Gene Dearling to Rod Watson;" reference, delete "Dearling" and insert
-- Dearing --.

Column 6,
Line 42, delete "element-".

Signed and Sealed this

Tenth Day of January, 2006

JON W. DUDAS
*Director of the United States Patent and Trademark Office*